(12) United States Patent
Chi et al.

(10) Patent No.: US 7,831,538 B2
(45) Date of Patent: Nov. 9, 2010

(54) EVOLUTIONARY SPECTRAL CLUSTERING BY INCORPORATING TEMPORAL SMOOTHNESS

(75) Inventors: Yun Chi, Santa Clara, CA (US);
Xiaodan Song, Santa Clara, CA (US);
Koji Hino, Cupertino, CA (US); Belle L. Tseng, Cupertino, CA (US)

(73) Assignee: NEC Laboratories America, Inc., Princeton, NJ (US)

( * ) Notice: Subject to any disclaimer, the term of this patent is extended or adjusted under 35 U.S.C. 154(b) by 610 days.

(21) Appl. No.: 11/874,395

(22) Filed: Oct. 18, 2007

(65) Prior Publication Data
US 2008/0294684 A1 Nov. 27, 2008

Related U.S. Application Data

(60) Provisional application No. 60/939,696, filed on May 23, 2007.

(51) Int. Cl.
G06F 17/30 (2006.01)
(52) U.S. Cl. ........................................ 706/55
(58) Field of Classification Search .................... 706/55
See application file for complete search history.

(56) References Cited

OTHER PUBLICATIONS

Yun Chi, Xiaodan Song, Dengyong Zhou, Koji Hino, Belle L. Tseng, Evolutionary Spectral Clustering by Incorporating Temporal Smoothness, KDD '07, Aug. 12-15, 2007, pp. 1-10.*

D. Chakrabarti, R. Kumar, and A. Tomkins Evolutionary clustering. In *Proc. of the 12th ACM SIGKDD Conference*, 2006.
I. S. Dhillon. Co-clustering documents and words using bipartite spectral graph partitioning. In *Proc. Of the 7th ACM SIGKDD Conference*, 2001.
I. S. Dhillon, Y. Guan, and B. Kulis. Kernel k-means: spectral clustering and normalized cuts. In *Proc. Of the 10th ACM SIGKDD Conference*, 2004.
C. Ding and X. He. K-means clustering via principal component analysis. In *Proc. of the 21st ICML Conference*, 2004.
X. Ji and W. Xu. Document clustering with prior knowledge. In *SIGIR*, 2006.
A. Ng, M. Jordan, and Y. Weiss. On spectral clustering: Analysis and an algorithm. In *NIPS*, 2001.
H. Ning, W. Xu, Y. Chi, Y. Gong, and T. Huang. Incremental spectral clustering with application to monitoring of evolving blog communities. In *SIAM Int. Conf. on Data Mining*, 2007.
K. Wagstaff, C. Cardie, S. Rogers, and S. Schroedl. Constrained K-means clustering with background knowledge. In *Proc. 18th ICML Conference*, 2001.
S. X. Yu and J. Shi. Segmentation given partial grouping constraints. *IEEE Trans. Pattern Anal.Mach. Intell.*, 26(2), 2004.
H. Zha, X. He, C. H. Q. Ding, M. Gu, and H. D.Simon. Spectral relaxation for k-means clustering. In *NIPS*, 2001.

* cited by examiner

*Primary Examiner*—Michael B. Holmes
*Assistant Examiner*—Ola Olude Afolabi
(74) *Attorney, Agent, or Firm*—Bao Tran; Joseph Kolodka

(57) ABSTRACT

Systems and methods are disclosed for clusterizing information by determining similarity matrix for historical information and similarity matrix for current information; generating an aggregated similarity matrix (aggregated kernel); and applying evolutionary spectral clustering on the aggregated kernel to a content stream to produce one or more clusters.

25 Claims, 8 Drawing Sheets

EVOLUTIONARY SPECTRAL CLUSTERING BY INCORPORATING TEMPORAL SMOOTHNESS

CROSS-REFERENCE TO RELATED APPLICATIONS

This application claims the benefit of priority to U.S. Provisional Patent Application Ser. No. 60/939,696, filed May 23, 2007, the content of which is incorporated herein by reference in its entirety.

FIELD OF THE INVENTION

The present invention relates to systems for performing evolutionary spectral clustering.

BACKGROUND OF THE INVENTION

In many clustering applications, the characteristics of the objects to be clustered change over time. Typically, such characteristic change contains both long-term trend due to concept drift and short-term variation due to noise. For example, in the blogosphere where blog sites are to be clustered (e.g., for community detection), the overall interests of a blogger and the blogger's friendship network may drift slowly over time and simultaneously, short-term variation may be triggered by external events. As another example, in a ubiquitous computing environment, moving objects equipped with GPS sensors and wireless connections are to be clustered (e.g., for traffic jam prediction or for animal migration analysis). The coordinate of a moving object may follow a certain route in the long-term but its estimated coordinate at a given time may vary due to limitations on bandwidth and sensor accuracy.

These application scenarios, where the objects to be clustered evolve with time, raise new challenges to traditional clustering algorithms. On one hand, the current clusters should depend mainly on the current data features—aggregating all historic data features makes little sense in non-stationary scenarios. On the other hand, the current clusters should not deviate too dramatically from the most recent history. This is because in most dynamic applications, the system does not expect data to change too quickly and as a consequence, the system expects certain levels of temporal smoothness between clusters in successive time steps. This point can be illustrated using an evolutionary clustering scenario example in FIG. 1. In this example, assume they system wants to partition 5 blogs into 2 clusters. FIG. 1 shows the relationship among the 5 blogs at time t−1 and time t, where each node represents a blog and the numbers on the edges represent the similarities (e.g., the number of links) between blogs. Obviously, the blogs at time t−1 should be clustered by Cut I. The clusters at time t are not so clear. Both Cut II and Cut III partition the blogs equally well. However, according to the principle of temporal smoothness, Cut III should be preferred because it is more consistent with recent history (time t−1).

In time series analysis, moving averages are often used to smooth out short-term fluctuations. Because similar short-term variances also exist in clustering applications, either due to data noises or due to non-robust behaviors of clustering algorithms (e.g., converging to different locally suboptimal modes), new clustering techniques are needed to handle evolving objects and to obtain stable and consistent clustering results.

In clustering data streams, large amounts of data that arrive at high rate make it impractical to store all the data in memory or to scan them multiple times. Such a new data model raises issues such as how to efficiently cluster massive data set by using limited memory and by one-pass scanning of data, and how to cluster evolving data streams under multiple resolutions so that a user can query any historic time period with guaranteed accuracy.

Incremental clustering algorithms have been used to efficiently apply dynamic updates to the cluster centers, medoids, or hierarchical trees when new data points arrive. However, newly arrived data points have no direct relationship with existing data points, other than that they probably share similar statistical characteristics. For example, moving objects can be clustered based on micro-clustering and an incremental spectral clustering algorithm has been applied to similarity changes among objects that evolve with time. However, the focus of these systems is to improve computation efficiency at the cost of lower cluster quality. Constrained clustering has also been used where either hard constraints such as cannot links and must links or soft constraints such as prior preferences are incorporated in the clustering task.

Evolutionary clustering is an emerging research area essential to important applications such as clustering dynamic Web and blog contents and clustering data streams. In evolutionary clustering, a good clustering result should fit the current data well, while simultaneously not deviate too dramatically from the recent history. To fulfill this dual purpose, a measure of temporal smoothness is integrated in the overall measure of clustering quality. In Chakrabarti et al., Evolutionary clustering, In *Proc. Of the 12th ACM SIGKDD Conference,* 2006, an evolutionary hierarchical clustering algorithm and an evolutionary k-means clustering algorithm are discussed. Chakrabarti et al. proposes to measure the temporal smoothness by a distance between the clusters at time t and those at time t−1. The cluster distance is defined by (1) pairing each centroid at t to its nearest peer at t−1 and (2) summing the distances between all pairs of centroids. However, the pairing procedure is based on heuristics and it could be unstable (a small perturbation on the centroids may change the pairing dramatically). Additionally, because Chakrabarti ignores the fact that the same data points are to be clustered in both t and t−1, this distance may be sensitive to the movement of data points such as shifts and rotations (e.g., consider a fleet of vehicles that move together while the relative distances among them remain the same).

SUMMARY OF THE INVENTION

Systems and methods are disclosed for clusterizing information by determining similarity matrix for historical information and similarity matrix for current information; generating an aggregated similarity matrix (aggregated kernel); and applying evolutionary spectral clustering on the aggregated kernel to a content stream to produce one or more clusters.

Implementations of the above aspect may include one or more of the following. The system can combine the similarity matrices to obtain the aggregated kernel. The system can scale the similarity matrices. The similarity matrices can be linearly combined to obtain the kernel. The system can determine a quality of current cluster result. The system can also determine temporal smoothness. Evolutionary clusters can be generated. The system can define a cost function to measure a quality of a clustering result on evolving information. The cost function can be defined using one or more graph-based measures. The cost function can be $$\text{Cost} = \alpha \cdot CS + \beta \cdot CT$$

where CS represents a snapshot cost that measures a snapshot quality of a current clustering result with respect to current data features and CT represents a temporal cost that measures a temporal smoothness, and where $0 \leq \alpha \leq 1$ is a parameter assigned by a user and together with $\beta(=1-\alpha)$, reflect the user's emphasis on the snapshot cost and temporal cost. CT can represent a goodness-of-fit of the current clustering result with respect to historic data features. CT can also measure a cluster quality. The system can determine a negated average association for evolutionary spectral clustering. A cost for evolutionary normalized cut can be generated. The system can derive corresponding optimal solutions such as relaxed optimal solutions. Such systems can be used for clusterizing blog entries for community detection.

In another aspect, a method for clusterizing information includes determining a first similarity matrix from a historic cluster obtained from historic information; generating an aggregated similarity matrix (aggregated kernel); and applying evolutionary spectral clustering on the aggregated kernel to a content stream to produce one or more clusters.

Implementations of the above aspect can include one or more of the following. The similarity matrices can be combined to obtain the kernel. The similarity matrices can be scaled. The system can linearly combine the similarly matrices to obtain the kernel. The system can determine a quality of current cluster result and temporal smoothness. The system can then generate evolutionary clusters. The cost function is defined using one or more graph-based measures. The cost function can be Cost=$\alpha \cdot$CS+$\beta \cdot$CT, where CS represents a snapshot cost that measures a snapshot quality of a current clustering result with respect to current data features and CT represents a temporal cost that measures a temporal smoothness, and where $0 \leq \alpha \leq 1$ is a parameter assigned by a user and together with $\beta(=1-\alpha)$, reflect the user's emphasis on the snapshot cost and temporal cost. CT represents a goodness-of-fit of the current clustering result with respect to historic data features. CT can be used to measure a cluster quality. The system can determine a negated average association for evolutionary spectral clustering. The system can also determine a cost for evolutionary normalized cut. Corresponding optimal solutions can be located, such as relaxed optimal solutions. The system can be used for clusterizing blog sites for community detection. The system supports changing cluster numbers and adding and removing of nodes.

Advantages of the system and/or method may include one or more of the following. The system provides the ability to solve the entire class of time-dependent clustering problem and to provide clustering results with higher quality. The system solves the evolutionary spectral clustering problems in a manner that provides more stable and consistent clustering results that are less sensitive to short-term noises and at the same time are adaptive to long-term cluster drifts. Furthermore, the system provides optimal solutions to the relaxed versions of the corresponding evolutionary k-means clustering problems. The system supports two frameworks for evolutionary spectral clustering in which the temporal smoothness is incorporated into the overall clustering quality. The system derives optimal solutions to the relaxed versions of the proposed evolutionary spectral clustering frameworks. Because the unrelaxed versions are shown to be NP-hard, the system provides practical ways of obtaining the final clusters and the upper bounds on the performance of the algorithms. The system can handle cases where the number of clusters changes with time and the case where new data points are inserted and old ones are removed over time. The system also obtains clusters that evolve smoothly over time. The constraints are not given a priori. Instead, the system sets its goal to optimize a cost function that incorporates temporal smoothness. As a consequence, some soft constraints are automatically implied when historic data and clusters are connected with current ones.

The clustering techniques in the system can be used in any applications where temporal information is available. Some examples include: community and event detection in the blogs and Web where the inter-relation among blogs and Web sites are changing with time, image segmentation for a sequence of images that follow temporal order, objects tracking in ubiquitous computing where objects equipped with sensors are moving around with time, among others.

BRIEF DESCRIPTION OF THE DRAWINGS

FIG. 12 shows an exemplary blog data set, while

DETAILED DESCRIPTION OF THE INVENTION

Figure 1:
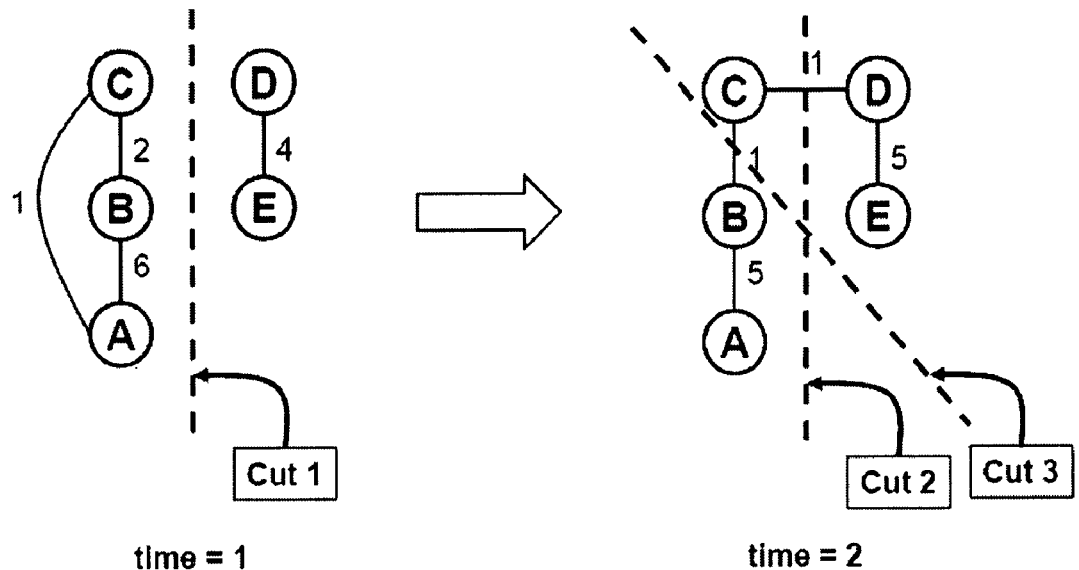
FIG. 1 illustrates an exemplary evolutionary clustering scenario.
Figure 2:
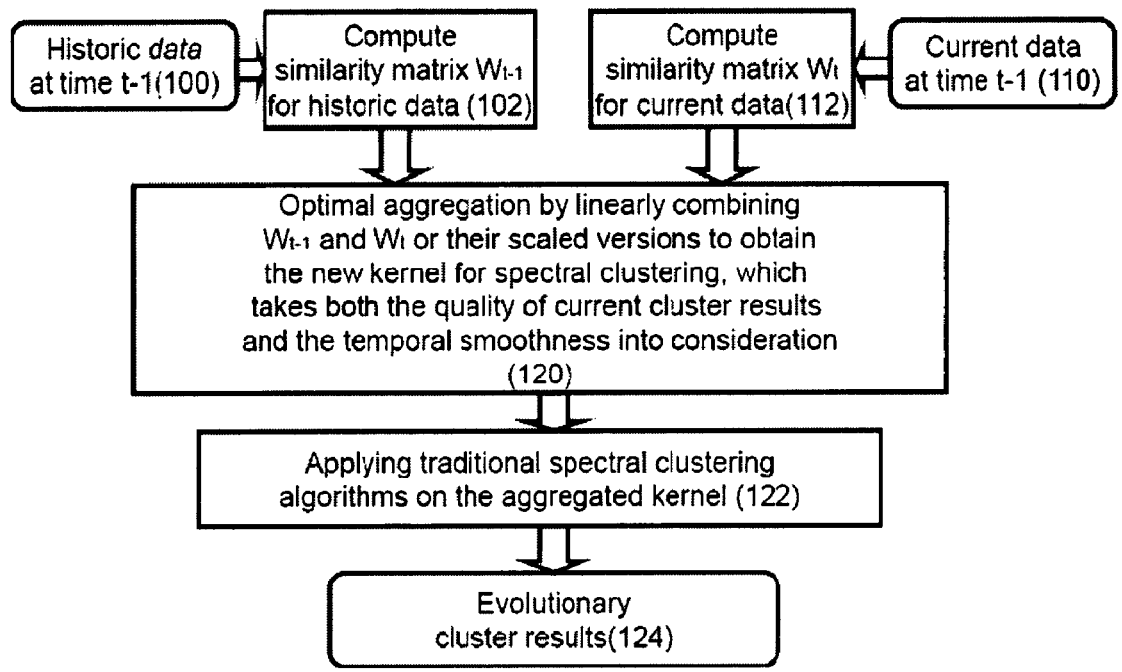
FIG. 2 shows an exemplary process that incorporates historic data to regularize temporal smoothness.

FIG. 2 shows an exemplary process that incorporates historic data to regularize temporal smoothness. In this process, historic data at time t−1 is obtained (100). The t−1 data is used to compute a similarity matrix $W_{t-1}$ for historic data (102). Next, current data at time t is obtained (110). The t data is used to compute a similarity matrix $W_t$ for current data (112). The system then performs optimal aggregation by linearly combining $W_{t-1}$ and $W_t$ or their scaled versions to obtain an aggregated similarity matrix ("aggregated kernel") for spectral clustering. The spectral clustering takes into consideration both the quality of the current cluster results and the temporal smoothness from the historic data to the current data (120). Next, spectral clustering is applied on the aggregated kernel (122). The system then generates evolutionary cluster results (124).

Figure 3:
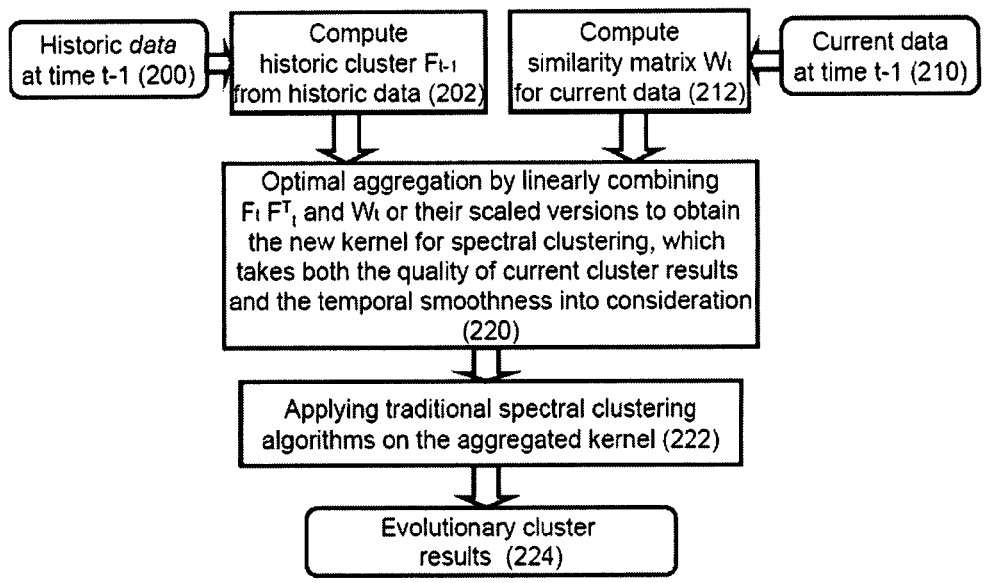
FIG. 3 shows an exemplary process to incorporate historic clusters to regularize temporal smoothness.

FIG. 3 shows an exemplary process to incorporate historic clusters to regularize temporal smoothness. In this process, historic data at time t−1 is obtained (200). The t−1 data is used to compute a similarity matrix for historic cluster $F_{t-1}$ (202). Next, historic data at time t is obtained (210). The t data is used to compute a similarity matrix $W_t$ for current data (212). The system then performs optimal aggregation by linearly combining $F_{t-1} F^T_{t-1}$ and $W_t$ (that is, $F_t$ is multiplied by its transpose and then combined with $W_t$) or their scaled versions to obtain a new kernel for spectral clustering. The spectral clustering takes into consideration both the quality of the current cluster results and the temporal smoothness (220). Next, spectral clustering is applied on the aggregated kernel (222). The system then generates evolutionary cluster results (224).

Figure 4:
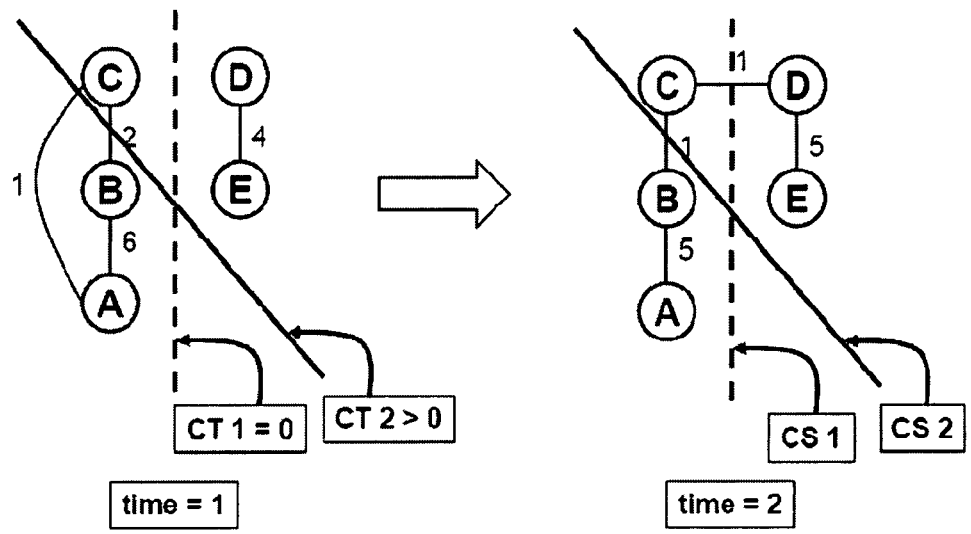
FIG. 4 shows an exemplary operation of a Preserving Cluster Quality (PCQ) system.
Figure 5:
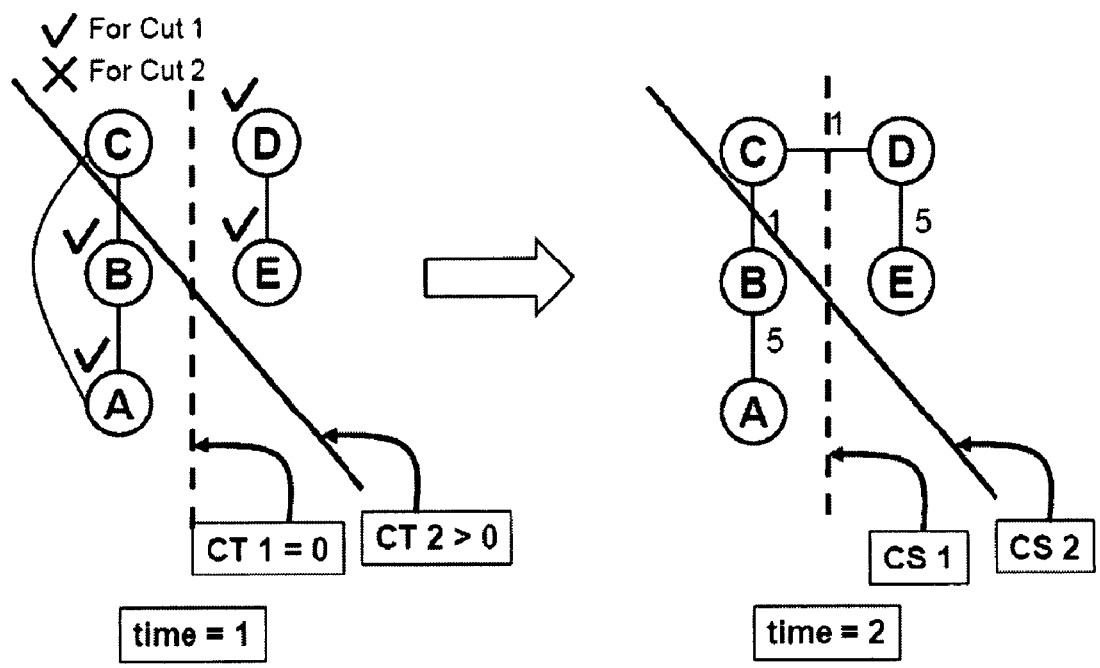
FIG. 5 shows an exemplary operation of a Preserving Cluster Membership (PCM) system.

FIGS. 4-5 show exemplary operations of the above processes. FIG. 4 shows an exemplary operation of a Preserving Cluster Quality (PCQ) system. This example shows two time slots, t=1 and t=2, and 5 blogs to be clustered into two groups. The nodes in the graph represent the blogs and the link represents the similarity among blogs (e.g., the number of interactions between blogs). At t=1, the partition of the two groups is straightforward— (A,B,C) should be in one group, and (D,E) should be in another group. However, at t=2, the partition is not so clear. Two solutions work equally well. The first partition, represented by the dashed-line cut, is (A,B,C)-(D,E). The second partition, represented by the solid-line cut, is (A,B)-(C,D,E). The two partitions are equally well in that their costs (the edge weight across the cut) are the same. However, if historic cost is taken into consideration, the two partitions have different costs. In the system's evolutionary spectral clustering framework, although the two partitions have the same snapshot cost at t=2 (CS1 and CS2 respectively), they have different temporal cost at time t=1. In the PCQ framework, we measure the temporal cost by how well the current partition (at time t=2) splits historic data (at time t=1). In the example of FIG. 4, the second partition (solid-line) is not as good as the first one, because at time t=1, it cuts through some edges with non-zero weights. On the other hand, the first partition (dashed-line) does not cut any edge at time t=1. In other words, the temporal cost CT1 for the first partition is smaller than that of the second partition CT2. Since the system defines the overall cost as $\alpha CS + (1-\alpha)CT$, then the first partition has lower overall cost than the second one and the PCQ spectral clustering result (by taking temporal smoothness into consideration) is (A,B,C)-(D,E).

FIG. 5 shows an exemplary operation of a Preserving Cluster Membership (PCM) system. Using the same set up of FIG. 4, the PCM framework measures the temporal cost by the difference between the current cluster membership (at time t=2) and the historic cluster membership (at time t=1). In this example, the second partition (solid-line) is not as good as the first one because it results a cluster membership (A,B)-(C,D,E) that is different from that at time t=1, (A,B,C)-(D,E). That is, node C switches its membership between t=1 and t=2 and therefore, the temporal smoothness is broken. On the other hand, the first partition (dashed-line) results in the same cluster memberships both at time t=1 and time t=2. The temporal cost CT1 for the first partition is smaller than that of the second partition CT2. Since the system defines the overall cost as $\alpha CS + (1-\alpha)CT$, then the first partition has lower overall cost than the second one and the PCM spectral clustering results (by taking temporal smoothness into consideration) will be (A,B,C)-(D,E).

Next, details on the above processes will be discussed. In the following discussion, capital letters, such as W and Z, represent matrices. Lower case letters in vector forms, such as $\vec{v}_i$ and $\vec{\mu}_l$, represent column vectors. Scripted letters, such as $\mathcal{V}$ and $\mathcal{V}_p$, represent sets. For easy presentation, for a given variable, such as W and $\vec{v}_i$, the system attaches a subscript t, i.e., $W_t$ and $\vec{v}_{i,t}$, to represent the value of the variable at time t. And the system uses $Tr(W)$ to represent the trace of W where $Tr(W)=\Sigma_i W(i,i)$. In addition, for a matrix $X \in \mathbb{R}^{n \times k}$, the system uses $span(X)$ to represent the subspace spanned by the columns of X. For vector norms the system uses the Euclidian norm and for matrix norms the system uses the Frobenius norm, i.e., $\|W\|^2 = \Sigma_{i,j} W(i,j)^2 = Tr(W^T W)$.

The clustering problem can be stated in the following way. For a set V of n nodes, a clustering result is a partition $\{V_1, \ldots, V_k\}$ of the nodes in V such that $V = \cup_{l=1}^{k} V_l$ and $V_p \cap V_q = \emptyset$ for $1 \leq p$, $q \leq k$, $p \neq q$. A partition (clustering result) can be equivalently represented as an n-by-k matrix Z whose elements are in $\{0,1\}$ where $Z(i,j)=1$ if only if node i belongs to cluster j. Obviously, $Z \cdot \vec{1}_k = \vec{1}_n$, where $\vec{1}_k$ and $\vec{1}_n$ are k-dimensional and n-dimensional vectors of all ones. In addition, the system can see that the columns of Z are orthogonal. Furthermore, Z can be normalized in the following way: the l-th column of Z is divided by $\sqrt{|V_l|}$ to get $\tilde{Z}$, where $|V_l|$ is the size of $V_l$. Note that the columns of $\tilde{Z}$ are orthonormal, i.e., $\tilde{Z}^T \tilde{Z} = I_k$.

K-Means Clustering

The k-means clustering problem is one of the most widely-studied clustering problems. Assume the i-th node in V can be represented by an m-dimensional feature vector $\vec{v}_i \in \mathbb{R}^m$, then the k-means clustering problem is to find a partition $\{V_1, \ldots, V_k\}$ that minimizes the following measure $$KM = \sum_{l=1}^{k} \sum_{i \in V_l} \|\vec{v}_i - \vec{\mu}_l\|^2$$

where $\vec{\mu}_l$ is the centroid (mean) of the l-th cluster, i.e., $\vec{\mu}_l = \Sigma_{j \in V_l} \vec{v}_j / |V_l|$.

A well-known algorithm to the k-means clustering problem is the so called k-means algorithm in which after initially randomly picking k centroids, the following procedure is repeated until convergence: all the data points are assigned to the clusters whose centroids are nearest to them, and then the cluster centroids are updated by taking the average of the data points assigned to them.

Spectral Clustering

The basic idea of spectral clustering is to cluster based on the eigenvectors of a (possibly normalized) similarity matrix W defined on the set of nodes in V. Very often W is positive semi-definite. Commonly used similarities include the inner product of the feature vectors, $W(i,j) = \vec{v}_i^T \vec{v}_j$, the diagonally-scaled Gaussian similarity, $W(i,j) = \exp(-(\vec{v}_i - \vec{v}_j)^T \text{diag}(\vec{\gamma})(\vec{v}_i - \vec{v}_j))$, and the affinity matrices of graphs.

Spectral clustering algorithms usually solve graph partitioning problems where different graph-based measures are to be optimized. Two popular measures are to maximize the average association and to minimize the normalized cut. For two subsets, $V_p$ and $V_q$, of the node set V (where $V_p$ and $V_q$ do not have to be disjoint), they system first defines the association between $V_p$ and $V_q$ as $assoc(V_p, V_q) = \Sigma_{i \in V_p, j \in V_q} W(i,j)$ Then the system can write the k-way average association as $$AA = \sum_{l=1}^{k} \frac{assoc(V_l, V_l)}{|V_l|}$$

and the k-way normalized cut as $$NC = \sum_{l=1}^{k} \frac{assoc(V_l, V \setminus V_l)}{assoc(V_l, V)}$$

where $V \setminus V_l$ is the complement of $V_l$. For consistency, the system further defines the negated average association as $$NA = Tr(W) - AA = Tr(W) - \sum_{l=1}^{k} \frac{assoc(V_l, V_l)}{|V_l|}$$

where, as will be shown later, NA is always non-negative if W is positive semi-definite. In the remaining of the paper, instead of maximizing AA, the system equivalently aims to minimize NA, and as a result, all the three objective functions, KM, NA and NC are to be minimized.

Finding the optimal partition Z for either the negated average association or the normalized cut is NP-hard. Therefore, in spectral clustering algorithms, usually a relaxed version of the optimization problem is solved by (1) computing eigenvectors X of some variations of the similarity matrix W, (2) projecting all data points to span(X), and (3) applying the k-means algorithm to the projected data points to obtain the clustering result. While it may seem nonintuitive to apply spectral analysis and then again use the k-means algorithm, it has been shown that such procedures have many advantages such as they work well in the cases when the data points are not linearly separable. Steps (2) and (3) uses standard procedures in traditional spectral clustering and thus will not be discussed in depth.

Two Frameworks for Evolutionary Spectral Clustering

Overview

The system defines a general cost function to measure the quality of a clustering result on evolving data points. The function contains two costs. The first cost, snapshot cost (CS), only measures the snapshot quality of the current clustering result with respect to the current data features, where a higher snapshot cost means worse snapshot quality. The second cost, temporal cost (CT), measures the temporal smoothness in terms of the goodness-of-fit of the current clustering result with respect to either historic data features or historic clustering results, where a higher temporal cost means worse temporal smoothness. The overall cost function is defined as a linear combination of these two costs:

$$Cost = \alpha \cdot CS + \beta \cdot CT$$

where $0 \leq \alpha \leq 1$ is a parameter assigned by the user and together with $\beta (=1-\alpha)$, they reflect the user's emphasis on the snapshot cost and temporal cost, respectively.

In both frameworks, for a current partition (clustering result), the snapshot cost CS is measured by the clustering quality when the partition is applied to the current data. The two frameworks are different in how the temporal cost CT is defined. In the first framework, which the system names PCQ for preserving cluster quality, the current partition is applied to historic data and the resulting cluster quality determines the temporal cost. In the second framework, which the system names PCM for preserving cluster membership, the current partition is directly compared with the historic partition and the resulting difference determines the temporal cost.

Preserving Cluster Quality (PCQ)

In the first framework, PCQ, the temporal cost is expressed as how well the current partition clusters historic data. The system illustrates this through an example shown in FIG. 4. Assume that two partitions, $Z_t$ and $Z_t'$, cluster the current data at time t equally well. However, to cluster historic data at time t−1, the clustering performance using partition $Z_t$ is better than using partition $Z_t'$. In such a case, $Z_t$ is preferred over $Z_t'$ because $Z_t$ is more consistent with historic data. The system formalizes this idea for the k-means clustering problem using the following overall cost function $$Cost_{KM} = \alpha \cdot CS_{KM} + \beta \cdot CT_{KM}$$
$$= \alpha \cdot KM_t |_{Z_t} + \beta \cdot KM_{t-1}|_{Z_t}$$
$$= \alpha \cdot \sum_{l=1}^{k} \sum_{i \in V_{l,t}} \|\vec{v}_{i,t} - \vec{\mu}_{l,t}\|^2 +$$
$$\beta \cdot \sum_{l=1}^{k} \sum_{i \in V_{l,t}} \|\vec{v}_{i,t-1} - \vec{\mu}_{l,t-1}\|^2$$

where $|_{Z_t}$ means "evaluated by the partition $Z_t$, where $Z_t$ is computed at time t" and $\vec{\mu}_{l,t-1} = \sum_{j \in V_{l,t}} \vec{v}_{j,t-1}/|V_{l,t}|$. Note that in the formula of $CT_{KM}$, the inner summation is over all data points in $V_{l,t}$, the clusters at time t. That is, although the feature values used in the summation are those at time t−1 (i.e., $\vec{v}_{i,t-1}$'s), the partition used is that at time t (i.e., $Z_t$). As a result, this cost $CT_{KM} = KM_{t-1}|_{Z_t}$ penalizes those clustering results (at t) that do not fit well with recent historic data (at t−1) and therefore promotes temporal smoothness of clusters.

Negated Average Association

The PCQ framework for evolutionary spectral clustering starts with the case of negated average association. At time t, for a given partition $Z_t$, a natural definition of the overall cost is $$Cost_{NA} = \alpha \cdot CS_{NA} + \beta \cdot CT_{NA}$$
$$= \alpha \cdot NA_t |_{Z_t} + \beta \cdot NA_{t-1}|_{Z_t}$$

The cluster quality is measured by the negated average association NA rather than the k-means KM.

Next, the system derives a solution to minimizing $Cost_{NA}$. First, the negated average association can be equivalently written as $$NA = Tr(W) - Tr(\tilde{Z}^T W \tilde{Z})$$

Therefore the system writes the overall cost as $$Cost_{NA} = \alpha \cdot [Tr(W_t) - Tr(\tilde{Z}_t^T W_t \tilde{Z}_t)] +$$
$$\beta \cdot [Tr(W_{t-1}) - Tr(\tilde{Z}_t^T W_{t-1} \tilde{Z}_t)]$$
$$= Tr(\alpha W_t + \beta W_{t-1}) - Tr[\tilde{Z}_t^T (\alpha W_t + \beta W_{t-1}) \tilde{Z}_t]$$

The first term $Tr(\alpha W_t + \beta W_{t-1})$ is a constant independent of the clustering partitions and as a result, minimizing $Cost_{NA}$ is equivalent to maximizing the trace $Tr[\tilde{Z}_t^T (\alpha W_t + \beta W_{t-1}) \tilde{Z}_t]$, subject to $\tilde{Z}_t$ being a normalized indicator matrix. Because maximizing the average association is an NP-hard problem, finding the solution $\tilde{Z}_t$ that minimizes $Cost_{NA}$ is also NP-hard. So following most spectral clustering algorithms, the system relaxes $\tilde{Z}_t$ to $X_t \in \mathbb{R}^{n \times k}$ with $X_t^T X_t = I_k$. It is known that one solution to this relaxed optimization problem is the matrix $X_t$ whose columns are the k eigenvectors associated with the top-k eigenvalues of matrix $\alpha W_t + \beta W_{t-1}$. Therefore, after computing the solution $X_t$ the system can project the data points into span($X_t$) and then apply k-means to obtain a solution to the evolutionary spectral clustering problem under the measure of negated average association. In addition, the value $\text{Tr}(\alpha W_t + \beta W_{t-1}) - \text{Tr}[X_t^T(\alpha W_t + \beta W_{t-1})X_t]$ provides a lower bound on the performance of the evolutionary clustering problem.

Moreover, a close connection between the k-means clustering problem and spectral clustering algorithms has been shown—if the system puts the m-dimensional feature vectors of the n data points in V into an m-by-n matrix $A = (\vec{v}_1, \ldots, \vec{v}_n)$, then $$KM = Tr(A^T A) - Tr(\tilde{Z}^T A^T A \tilde{Z})$$

The k-means clustering problem is a special case of the negated average association spectral clustering problem, where the similarity matrix W is defined by the inner product $A^T A$. As a consequence, the solution to the NA evolutionary spectral clustering problem can also be applied to solve the k-means evolutionary clustering problem in the PCQ framework, i.e., under the cost function previously defined.

Normalized Cut

For the normalized cut, the system defines the overall cost for evolutionary normalized cut to be $$Cost_{NC} = \alpha \cdot CS_{NC} + \beta \cdot CT_{NC}$$
$$= \alpha \cdot NC_t|_{Z_t} + \beta \cdot NC_{t-1}|_{Z_t}$$

However, computing the optimal solution to minimize the normalized cut is NP-hard. As a result, finding an indicator matrix $Z_t$ that minimizes $Cost_{NC}$ is also NP-hard. The system now provides an optimal solution to a relaxed version of the problem.

For a given partition Z, the normalized cut can be equivalently written as $$NC = k - Tr[Y^T(D^{-1/2}WD^{-1/2})Y]$$

where D is a diagonal matrix with $D(i,i) = \Sigma_{j=1}^n W(i,j)$ and Y is any matrix in $\mathbb{R}^{n \times k}$ that satisfies two conditions: (a) the columns of $D^{-1/2}Y$ are piecewise constant with respect to Z and (b) $Y^T Y = I_k$. The system remove the constraint (a) to get a relaxed version for the optimization problem $$Cost_{NC} \approx$$
$$\alpha \cdot k - \alpha \cdot Tr[X_t^T(D_t^{-\frac{1}{2}} W_t D_t^{-\frac{1}{2}})X_t] + \beta \cdot k - \beta \cdot Tr[X_t^T(D_{t-1}^{-\frac{1}{2}} W_{t-1} D_{t-1}^{-\frac{1}{2}})X_t] =$$
$$k - Tr[X_t^T(\alpha D_t^{-\frac{1}{2}} W_t D_t^{-\frac{1}{2}} + \beta D_{t-1}^{-\frac{1}{2}} W_{t-1} D_{t-1}^{-\frac{1}{2}})X_t]$$

for some $X_t \in \mathbb{R}^{n \times k}$ such that $X_t^T X_t = I_k$. Again the system has a trace maximization problem and a solution is the matrix $X_t$ whose columns are the k eigenvectors associated with the top-k eigenvalues of matrix $$\alpha D_t^{-\frac{1}{2}} W_t D_t^{-\frac{1}{2}} + \beta D_{t-1}^{-\frac{1}{2}} W_{t-1} D_{t-1}^{-\frac{1}{2}}.$$

And again, after obtaining $X_t$, the system can further project data points into span($X_t$) and then apply the k-means algorithm to obtain the final clusters.

Moreover, the normalized cut approach can be used to minimize the cost function of a weighted kernel k-means problem. As a consequence, the evolutionary spectral clustering algorithm can also be applied to solve the evolutionary version of the weighted kernel k-means clustering problem.

The PCQ evolutionary clustering framework provides a data clustering technique similar to the moving average framework in time series analysis, in which the short-term fluctuation is expected to be smoothed out. The solutions to the PCQ framework turn out to be very intuitive—the historic similarity matrix is scaled and combined with current similarity matrix and the new combined similarity matrix is fed to traditional spectral clustering algorithms.

One assumption used in the above derivation is that the temporal cost is determined by data at time t−1 only. However, the PCQ framework can be easily extended to cover longer historic data by including similarity matrices W's at older time, probably with different weights (e.g., scaled by an exponentially decaying factor to emphasize more recent history).

Preserving Cluster Membership (PCM)

The second framework of evolutionary spectral clustering, PCM, is different from the first framework, PCQ, in how the temporal cost is measured.

In this second framework, the temporal cost is expressed as the difference between the current partition and the historic partition. FIG. 5 shows this example. Assume that two partitions, $Z_t$ and $Z_t'$, cluster current data at time t equally well. However, when compared to the historic partition $Z_{t-1}$, $Z_t$ is much more similar to $Z_{t-1}$ than $Z_t'$ is. In such a case, $Z_t$ is preferred over $Z_t'$ because $Z_t$ is more consistent with historic partition.

The current partition is defined as $Z_t = \{V_{1,t}, \ldots, V_{k,t}\}$ and the historic partition as $Z_{t-1} = \{V_{1,t-1}, \ldots, V_{k,t-1}\}$. A measure for the difference between $Z_t$ and $Z_{t-1}$ is defined next. Comparing two partitions has long been studied in the literatures of classification and clustering. Here the traditional chi-square statistics is used to represent the distance between two partitions $$\chi^2(Z_t, Z_{t-1}) = n \left( \sum_{i=1}^k \sum_{j=1}^k \frac{|v_{ij}|^2}{|v_{i,t}| \cdot |v_{j,t-1}|} - 1 \right)$$

where $|V_{ij}|$ is the number of nodes that are both in $V_{i,t}$ (at time t) and in $V_{j,t-1}$ (at time t−1). In the above definition, the number of clusters k does not have to be the same at time t and t−1. By ignoring the constant shift of −1 and the constant scaling n, the temporal cost for the k-means clustering problem is defined as $$CT_{KM} = -\sum_{i=1}^k \sum_{j=1}^k \frac{|v_{ij}|^2}{|v_{i,t}| \cdot |v_{j,t-1}|}$$

where the negative sign is because the system wants to minimize $CT_{KM}$. The overall cost can be written as $$Cost_{KM} = \alpha \cdot CS_{KM} + \beta \cdot CT_{KM}$$

$$= \alpha \cdot \sum_{l=1}^{k} \sum_{i \in v_{l,t}} \|\vec{v}_{i,t} - \vec{\mu}_{l,t}\|^2 - \beta \cdot \sum_{i=1}^{k} \sum_{j=1}^{k} \frac{|v_{ij}|^2}{|v_{i,t}| \cdot |v_{j,t-1}|}$$

Negated Average Association

For negated average association, NA=Tr($\tilde{Z}^T W \tilde{Z}$) should be maximized. In this case $\tilde{Z}$ is further relaxed to continuous-valued X, whose columns are the k eigenvectors associated with the top-k eigenvalues of W. So in the PCM framework, the system defines a distance dist($X_t, X_{t-1}$) between $X_t$, a set of eigenvectors at time t, and $X_{t-1}$, a set of eigenvectors at time t−1. However, for a solution $X \in \Re^{n \times k}$ that maximizes Tr($X^T W X$), any X'=XQ is also a solution, where $Q \in \Re^{k \times k}$ is an arbitrary orthogonal matrix. This is because TR($X^T W X$)=Tr($X^T W X Q Q^T$)=Tr(($XQ)^T W X Q$)=Tr($X'^T W X'$). Therefore a distance dist($X_t, X_{t-1}$) is determined that is invariant with respect to the rotation Q. One such solution, is the norm of the difference between two projection matrices, i.e., $$dist(X_t, X_{t-1}) = \frac{1}{2} \|X_t X_t^T - X_{t-1} X_{t-1}^T\|^2$$

which essentially measures the distance between span($X_t$) and span($X_{t-1}$). The number of columns in $X_t$ does not have to be the same as that in $X_{t-1}$ as discussed in the next section.

By using this distance to quantify the temporal cost, the system derives the total cost for the negated average association as $$Cost_{NA} = \alpha \cdot CS_{NA} + \beta \cdot CT_{NA}$$

$$= \alpha \cdot [Tr(Wt) - Tr(X_t^T W_t X_t)] + \frac{\beta}{2} \cdot \|X_t X_t^T - X_{t-1} X_{t-1}^T\|^2$$

$$= \alpha \cdot [Tr(Wt) - Tr(X_t^T W_t X_t)] +$$

$$\frac{\beta}{2} Tr(X_t X_t^T - X_{t-1} X_{t-1}^T)^T (X_t X_t^T - X_{t-1} X_{t-1}^T)$$

$$= \alpha \cdot [Tr(Wt) - Tr(X_t^T W_t X_t)] +$$

$$\frac{\beta}{2} Tr(X_t X_t^T X_t X_t^T - 2 X_t X_t^T X_{t-1} X_{t-1}^T + X_{t-1} X_{t-1}^T X_{t-1} X_{t-1}^T)$$

$$= \alpha \cdot [Tr(Wt) - Tr(X_t^T W_t X_t)] + \beta k - \beta Tr(X_t^T X_{t-1} X_{t-1}^T X_t)$$

$$= \alpha \cdot Tr(W_t) + \beta \cdot k - Tr[X_t^T (\alpha W_t + \beta X_{t-1} X_{t-1}^T) X_t]$$

Therefore, an optimal solution that minimizes $Cost_{NA}$ is the matrix $X_t$ whose columns are the k eigenvectors associated with the top-k eigenvalues of the matrix $\alpha W_t + \beta X_{t-1} X_{t-1}^T$. After getting $X_t$, the following steps are the same as before. Furthermore, $$\frac{1}{2} \|\tilde{Z}_t \tilde{Z}_t^T - \tilde{Z}_{t-1} \tilde{Z}_{t-1}^T\|^2 = k - \sum_{i=1}^{k} \sum_{j=1}^{k} \frac{|v_{ij}|^2}{|v_{i,t}| \cdot |v_{j,t-1}|}$$

As a result, the evolutionary spectral clustering based on negated average association in the PCM framework provides a relaxed solution to the evolutionary k-means clustering problem defined in the PCM framework.

Normalized Cut

The PCM framework can be extended from the negated average association to normalized cut as $$Cost_{NC} = \alpha \cdot CS_{NC} + \beta \cdot CT_{NC}$$

$$= \alpha \cdot k - \alpha \cdot Tr\left[X_t^T \left(D_t^{-\frac{1}{2}} W_t D_t^{-\frac{1}{2}}\right) X_t\right] +$$

$$\frac{\beta}{2} \cdot \|X_t X_t^T - X_{t-1} X_{t-1}^T\|^2$$

$$= k - Tr\left[X_t^T \left(\alpha D_t^{-\frac{1}{2}} W_t D_t^{-\frac{1}{2}} + \beta X_{t-1} X_{t-1}^T\right) X_t\right]$$

Therefore, an optimal solution that minimizes $Cost_{NC}$ is the matrix $X_t$ whose columns are the k eigenvectors associated with the top-k eigenvalues of the matrix $$\alpha D_t^{-\frac{1}{2}} W_t D_t^{-\frac{1}{2}} + \beta X_{t-1} X_{t-1}^T.$$

After obtaining $X_t$, the subsequent steps are the same as before.

In the PCM framework, $Cost_{NC}$ has an advantage over $Cost_{NA}$ in terms of the ease of selecting an appropriate $\alpha$. In $Cost_{NA}$, the two terms $CS_{NA}$ and $CT_{NA}$ are of different scales—$CS_{NA}$ measures a sum of variances and $CT_{NA}$ measures some probability distribution. Consequently, this difference needs to be considered when choosing $\alpha$. In contrast, for $Cost_{NC}$, because the $CS_{NC}$ is normalized, both $$D_t^{-\frac{1}{2}} W_t D_t^{-\frac{1}{2}}$$

and $X_{t-1} X_{t-1}^T$ have the same 2-norms scale, for both matrices have $\lambda_{max}$=1. Therefore, the two terms $CS_{NC}$ and $CT_{NC}$ are comparable and a can be selected in a straightforward way.

In the PCM evolutionary clustering framework, all historic data are taken into consideration (with different weights)—$X_t$ partly depends on $X_{t-1}$, which in turn partly depends on $X_{t-2}$ and so on. In one extreme case, when $\alpha$ approaches 1, the temporal cost will become unimportant and as a result, the clusters are computed at each time window independent of other time windows. On the other hand, when $\alpha$ approaches 0, the eigenvectors in all time windows are required to be identical. Then the problem becomes a special case of the higher-order singular value decomposition problem, in which singular vectors are computed for the three modes (the rows of W, the columns of W, and the timeline) of a data tensor W where W is constructed by concatenating $W_t$'s along the timeline.

In addition, if the similarity matrix $W_t$ is positive semi-definite, then $$\alpha D_t^{-\frac{1}{2}} W_t D_t^{-\frac{1}{2}} + \beta X_{t-1} X_{t-1}^T$$

is also positive semi-definite because both $$D_t^{-\frac{1}{2}} W_t D_t^{-\frac{1}{2}}$$

and $X_{t-1} X_{t-1}^T$ are positive semi-definite.

Next, a comparison of the PCQ and PCM frameworks will be discussed. For simplicity of discussion, only time slots t and t−1 are considered and older history is ignored.

In terms of the temporal cost, PCQ aims to maximize $Tr(X_t^T W_{t-1} X_t)$ while for PCM, $Tr(X_t^T X_{t-1} X_{t-1}^T X_t)$ is to be maximized. However, these two are closely connected. By applying the eigen-decomposition on $W_{t-1}$, the system has $$X_t^T W_{t-1} X_t = X_t^T (X_{t-1}, X_{t-1}^\perp) \Lambda_{t-1} (X_{t-1}, X_{t-1}^\perp)^T X_t$$

where $\Lambda_{t-1}$ is a diagonal matrix whose diagonal elements are the eigenvalues of $W_{t-1}$ ordered by decreasing magnitude, and $X_{t-1}$ and $X_{t-1}^\perp$ are the eigenvectors associated with the first k and the residual n−k eigenvalues of $W_{t-1}$, respectively. It can be easily verified that both $Tr(X_t^T W_{t-1} X_t)$ and $Tr(X_t^T X_{t-1} X_{t-1}^T X_t)$ are maximized when $X_t = X_{t-1}$ (or more rigorously, when $span(X_t) = span(X_{x-1})$).

The differences between PCQ and PCM are (a) if the eigenvectors associated with the smaller eigenvalues (other than the top k) are considered and (b) the level of penalty when $X_t$ deviates from $X_{t-1}$. For PCQ, all the eigenvectors are considered and their deviations between time t and t−1 are penalized according to the corresponding eigenvalues. For PCM, rather than all eigenvectors, only the first k eigenvectors are considered and they are treated equally. In other words, in the PCM framework, other than the historic cluster membership, all details about historic data are ignored.

Although by keeping only historic cluster membership, PCM introduces more information loss, there may be benefits in other aspects. For example, the CT part in the PCM framework does not necessarily have to be temporal cost—it can represent any prior knowledge about cluster membership. For example, the system can cluster blogs purely based on interlinks. However, other information such as the content of the blogs and the demographic data about the bloggers may provide valuable prior knowledge about cluster membership that can be incorporated into the clustering. The PCM framework can handle such information fusion easily.

There are two assumptions in the PCQ and the PCM framework discussed above. First, the system assumed that the number of clusters remains the same over all time. Second, the system assumed that the same set of nodes is to be clustered in all timesteps. Both assumptions are too restrictive in many applications. In this section, the frameworks are extended to handle the issues of variation in cluster numbers and insertion/removal of nodes over time.

Variation in Cluster Numbers

So far, the system has assumed that the number of clusters k does not change with time. However, keeping a fixed k over all time windows is a strong restriction. Various effective methods for selecting appropriate cluster numbers (e.g., by thresholding the gaps between consecutive eigenvalues) can be used. The number of cluster k at time t can determined by one of these methods.

If the cluster number k at time t is different from the cluster number k' at time t−1, both the PCQ and the PCM frameworks can handle variations in cluster number. In the PCQ framework, the temporal cost is expressed by historic data themselves, not by historic clusters and therefore the computation at time t is independent of the cluster number k' at time t−1. In the PCM framework, the partition distance and the subspace distance can both be used without change when the two partitions have different numbers of clusters. As a result, the PCQ and PCM frameworks can handle variations in the cluster numbers.

Insertion and Removal of Nodes

In many applications the data points to be clustered may vary with time. In the blog example application, often there are old bloggers who stop blogging and new bloggers who just start.

Node Insertion and Removal in PCQ

For the PCQ framework, the key is $\alpha W_t + \beta W_{t-1}$. When old nodes are removed, the system can simply remove the corresponding rows and columns from $W_{t-1}$ to get $\tilde{W}_{t-1}$ (assuming $\tilde{W}_{t-1}$ is $n_1 \times n_1$). However, when new nodes are inserted at time t, the system needs to add entries to $\tilde{W}_{t-1}$ and to extended it to $\hat{W}_{t-1}$, which has the same dimension as $W_t$ (assuming $W_t$ is $n_2 \times n_2$). Without lost of generality, the system assumes that the first $n_1$ rows and columns of $W_t$ correspond to those nodes in $\tilde{W}_{t-1}$. The system defines $$\hat{W}_{t-1} = \begin{bmatrix} \tilde{W}_{t-1} & E_{t-1} \\ E_{t-1}^T & F_{t-1} \end{bmatrix} \text{ for } \begin{cases} E_{t-1} = \frac{1}{n_1} \tilde{W}_{t-1} \vec{1}_{n_1} \vec{1}_{n_2-n_1}^T \\ F_{t-1} = \frac{1}{n_1^2} \vec{1}_{n_1}^T \tilde{W}_{t-1} \vec{1}_{n_1} \vec{1}_{n_2-n_1} \vec{1}_{n_2-n_1}^T \end{cases}$$

Such a heuristic has the following good property:

Property 1 (1) $\hat{W}_{t-1}$ is positive semi-definite if $W_{t-1}$ is. (2) In $\hat{W}_{t-1}$, for each existing node $v_{old}$, each newly inserted node $v_{new}$ looks like an average node in that the similarity between $v_{new}$ and $v_{old}$ is the same as the average similarity between any existing node and $v_{old}$. (3) In $\hat{W}_{t-1}$, the similarity between any pair of newly inserted nodes is the same as the average similarity among all pairs of existing nodes. The property is appealing when no prior knowledge is given about the newly inserted nodes.

Node Insertion and Removal in PCM

For the PCM framework, when old nodes are removed, the system removes the corresponding rows from $X_{t-1}$ to get $\tilde{X}_{t-1}$ (assuming $\tilde{X}_{t-1}$ is $n_1 \times k$). When new nodes are inserted at time t, the system extends $\tilde{X}_{t-1}$ to $\hat{X}_{t-1}$, which has the same dimension as $X_t$ (assuming $X_t$ is $n_2 \times k$) as follows $$\hat{X}_{t-1} = \begin{bmatrix} \tilde{X}_{t-1} \\ G_{t-1} \end{bmatrix} \text{ for } G_{t-1} = \frac{1}{n_1} \vec{1}_{n_2-n_1} \vec{1}_{n_1}^T \tilde{X}_{t-1}$$

That is, the system inserts new rows as the row average of $\tilde{X}_{t-1}$. After obtaining $\hat{X}_{t-1}$, the system replaces the term $\beta X_{t-1} X_{t-1}^T$ with $\beta \hat{X}_{t-1} (\hat{X}_{t-1}^T \hat{X}_{t-1})^{-1} \hat{X}_{t-1}^T$. The foregoing equation corresponds to, for each newly inserted nodes, assigning to it a prior clustering membership that is approximately proportional to the size of the clusters at time t−1.

Next, experimental studies based on both synthetic data sets and a real blog data set are discussed. First, several experiments on synthetic data sets are reported to illustrate the good properties of the PCQ and PCM algorithms.

NA-Based Evolutionary Spectral Clustering

Three experimental studies based on synthetic data are discussed next. In the first experiment, a stationary case is tested where data variation is due to a zero-mean noise. In the second experiment, a non-stationary case is tested where there are concept drifts. In the third experiment, a case tests large differences between the PCQ and PCM frameworks.

Using the k-means algorithm, two baselines are done. The first baseline called ACC accumulates all historic data before the current timestep t and applies the k-means algorithm on the aggregated data. The second baseline called IND independently applies the k-means algorithm on the data in only timestep t and ignore all historic data before t.

The system uses the NA-based PCQ and PCM algorithms because of the equivalence between the NA-based spectral clustering problem and the k-means clustering problem. The system uses $W=A^TA$ in the NA-based evolutionary spectral clustering and compares its results with that of the k-means baseline algorithms. For a fair comparison, the system uses the KM defined for the k-means clustering problem as the measure for performance, where a smaller KM value is better.

Figure 6:
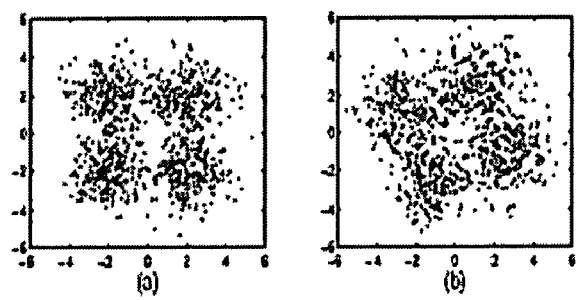
FIG. 6 shows an exemplary graph of experimental data points in a non-stationary case.

The data points to be clustered are generated in the following way. 800 two-dimensional data points are initially positioned as described in FIG. 6(a) at timestep 1. As can be seen, there are roughly four clusters (the data were actually generated by using four Gaussian distributions centered in the four quadrants). Then in timesteps 2 to 10, the system perturbs the initial positions of the data points by adding different noises according to the experimental setup. Unless stated otherwise, all experiments are repeated 50 times with different random seeds and the average performances are reported.

In the first experiment, for timesteps 2 through 10, the system add an i.i.d. Gaussian noise following N(0,0.5) to the initial positions of the data points. The system uses this data to simulation a stationary situation where the concept is relatively stable but there exist short-term noises.

Figure 7:
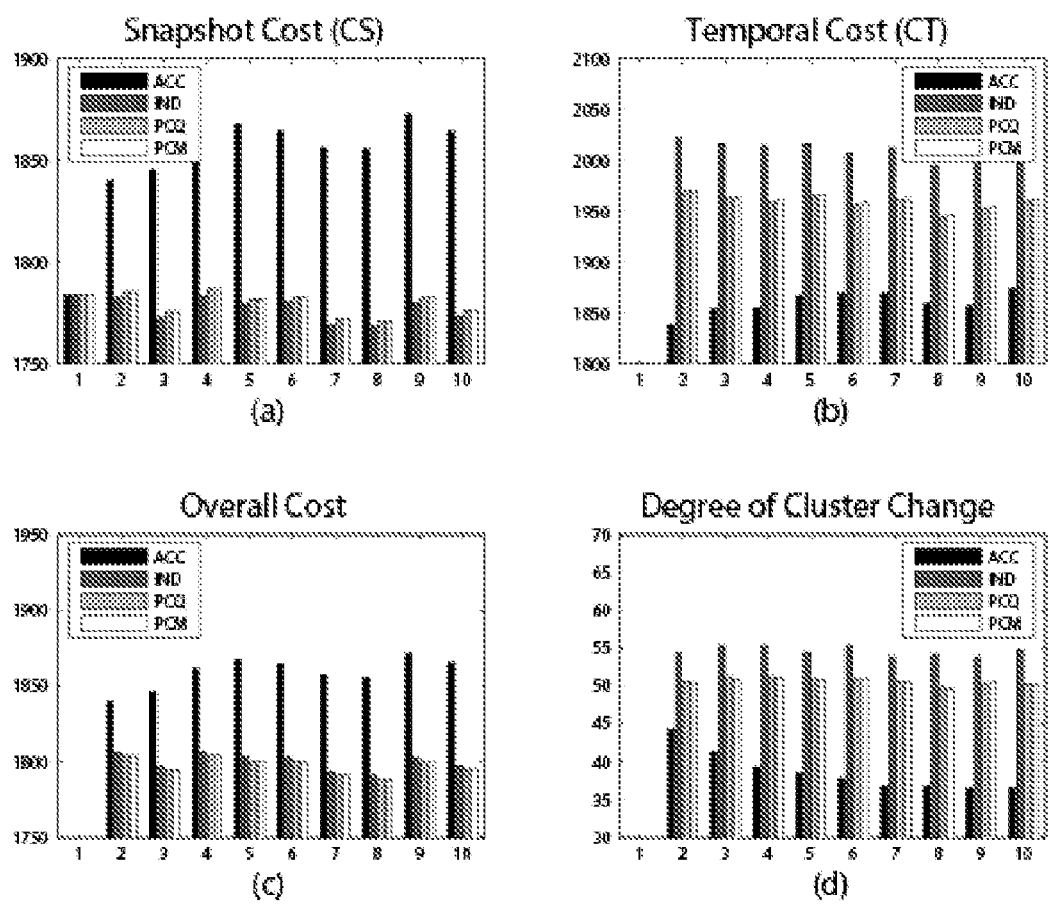
FIG. 7 shows exemplary experimental results for a stationary synthetic data set.

In FIGS. 7(a) and 7(b), the system reports the snapshot cost $CS_{KM}$ and the temporal cost $CT_{KM}$ for the two baselines and for the algorithms (with α=0.9 for both PCQ and PCM) from timesteps 1 to 10. For both costs, a lower value is better. As can be seen from the figure, the ACC baseline has low temporal smoothness but very high snapshot cost, whereas the IND baseline has the low snapshot cost but very high temporal cost. In comparison, the two algorithms show low temporal cost at the price of a little increase in snapshot cost. The overall cost $\alpha \cdot CS_{KM} + \beta \cdot CT_{KM}$ is given in FIG. 7(c). As can be seen, the ACC baseline has the worst overall performance and our algorithms improve a little over the IND baseline. In addition, FIG. 7(d) shows the degree of cluster change over time. The performance for the stationary synthetic data set, which shows that PCQ and PCM result in low temporal cost at a price of a small increase in snapshot cost. As expected, the cluster membership change using the frameworks is less dramatic than that of the IND baseline, which takes no historic information into account.

Figure 8:
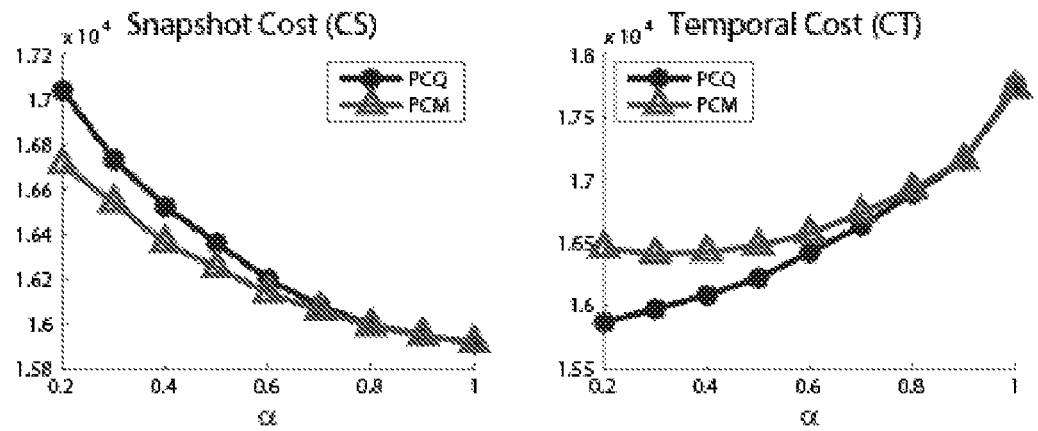
FIG. 8 shows exemplary average snapshot costs and temporal costs under various settings.

Next, for the same data set, α is increased from 0.2 to 1 with a step of 0.1. FIG. 8 shows the average snapshot cost and the temporal cost over all 10 timesteps under different settings of α. As expected, when a increases, to emphasize more on the snapshot cost, better snapshot quality is achieved at the price of worse temporal smoothness. This result demonstrates that the instant frameworks are able to control the tradeoff between the snapshot quality and the temporal smoothness.

Figure 9:
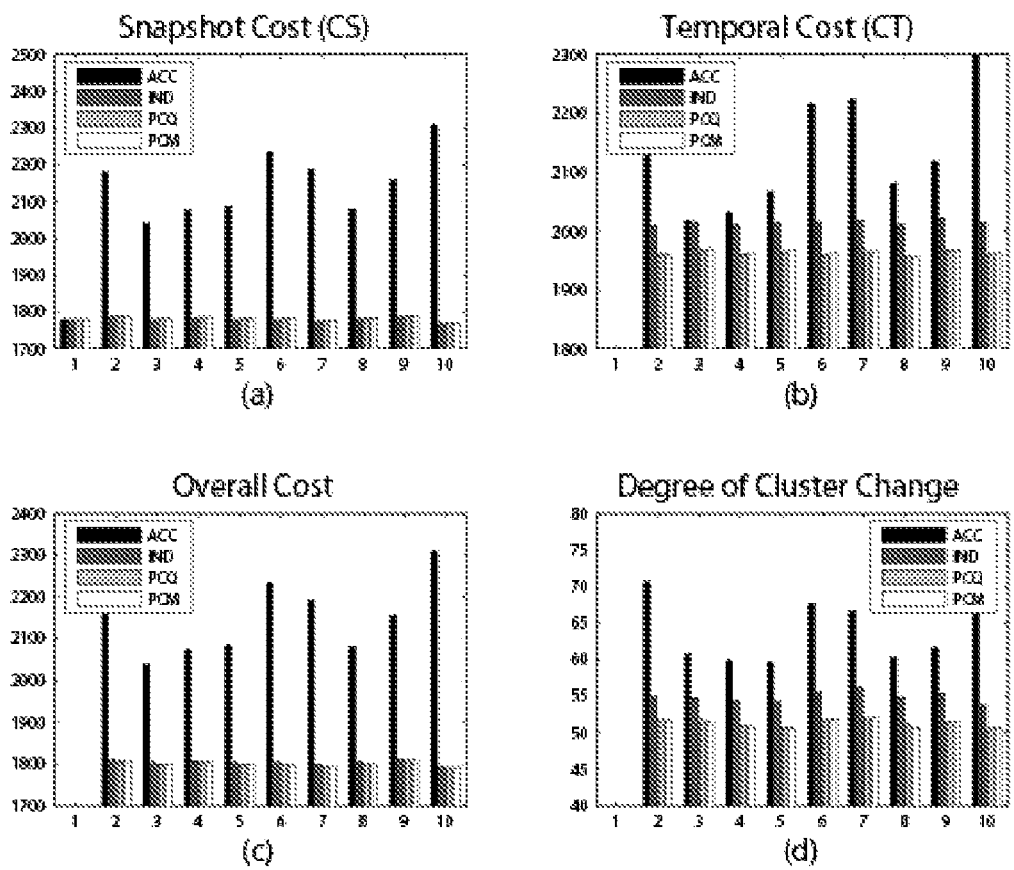
FIG. 9 shows exemplary performance for a non-stationary synthetic data set.

In the second experiment, the system simulates a non-stationary situation. At timesteps 2 through 10, before adding random noises, the system first rotates all data points by a small random angle (with zero mean and a variance of π/4). FIG. 2(b) shows the positions of data points in a typical timestep. FIG. 9 shows the performance of the four algorithms. As can be seen, while the performance of the instant algorithms and the IND baseline has little change, the performance of the ACC baseline becomes very poor. This result shows that if an aggregation approach is used, the system should not aggregate the data features in a non-stationary scenario—instead, the system should aggregate the similarities among data points.

In the third experiment, the system shows a case where the PCQ and PCM frameworks behave differently. The system first generates data points using the procedure described in the first experiment (the stationary scenario), except that this time the system generates 60 timesteps for a better view. This time, instead of 4 clusters, the system lets the algorithms partition the data into 2 clusters. From FIG. 6(a) there are obviously two possible partitions, a horizontal cut or a vertical cut at the center, that will give similar performance where the performance difference will mainly be due to short-term noises.

Figure 10:
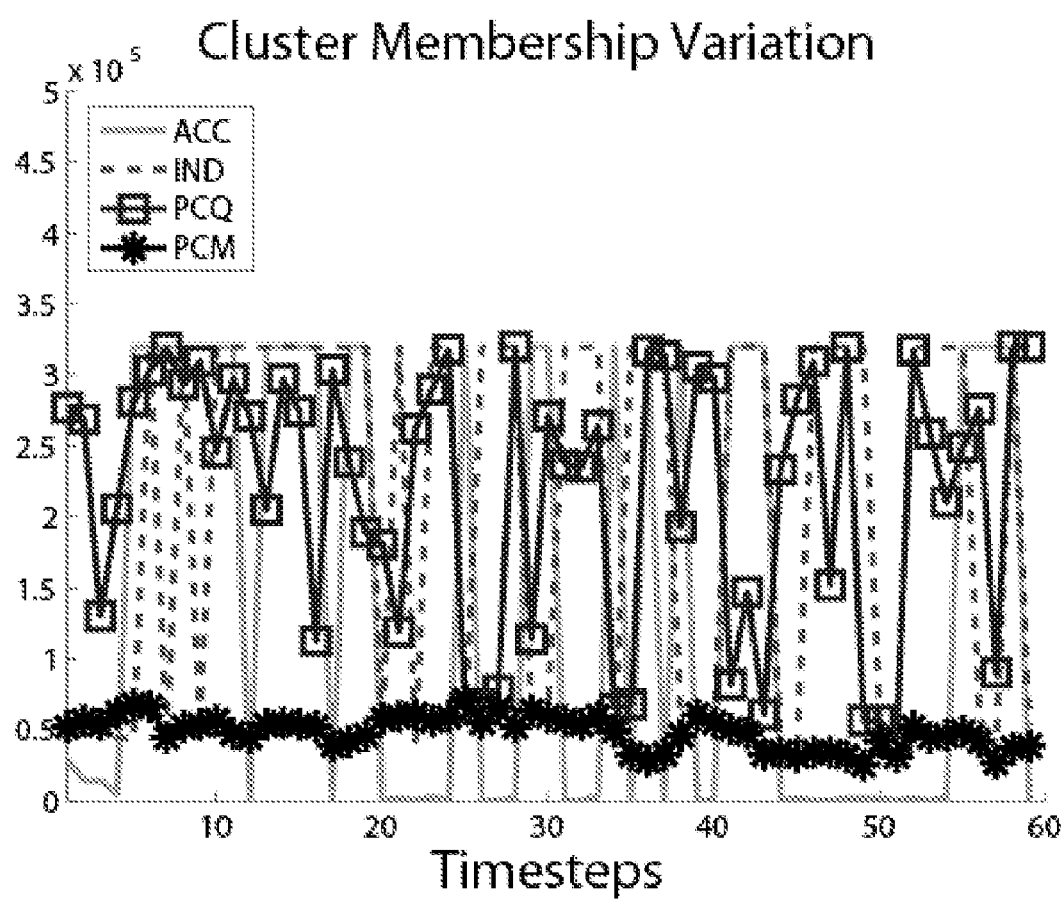
FIG. 10 shows a graph illustrating cluster membership variations and showing a case where the PCM process is more robust than the PCQ process.

FIG. 10 shows the degree of cluster membership change over the 60 timesteps in one run (no averaging is taken in this experiment). As can be seen, the cluster memberships of the two baselines jump around, which shows that they are not robust to noise in this case. Also can be seen, the cluster membership of the PCM algorithm varies much lesser than that of the PCQ algorithm. The reason for this difference is that switching the partition from the horizontal cut to the vertical cut will introduce much higher penalty to PCM than to PCQ-PCM is directly penalized by the change of eigenvectors, which corresponds to the change of cluster membership; for PCQ, the penalty is indirectly acquired from historic data, not historic cluster membership.

Figure 11:
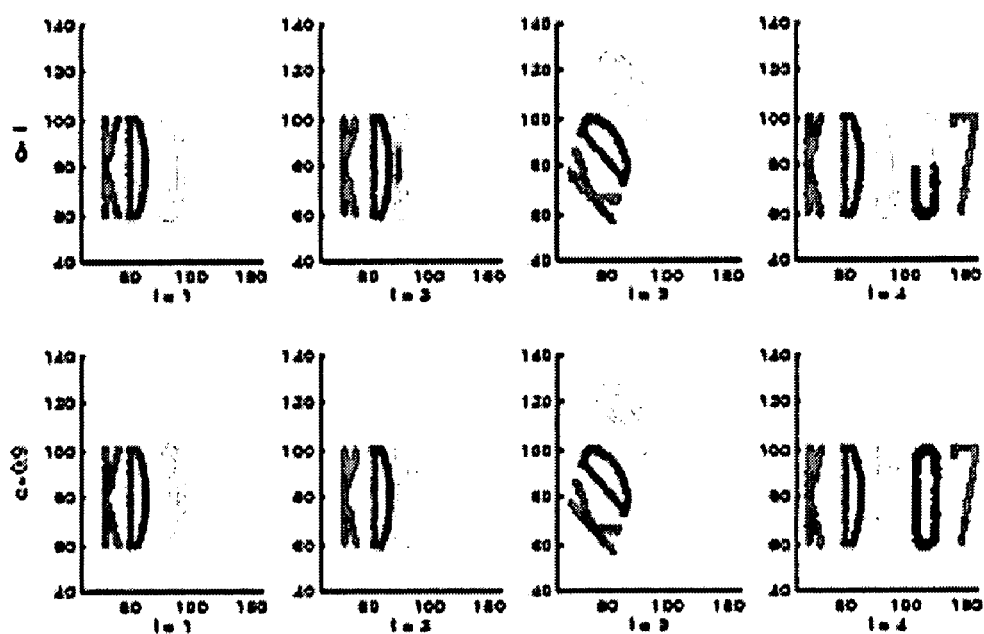
FIG. 11 shows an exemplary result illustrating the efficacy of evolutionary spectral clustering.

Next, NC-based Evolutionary Spectral Clustering experiments will be discussed. It is difficult to compare the NC-based evolutionary spectral clustering with the k-means clustering algorithm. Instead, in this experiment, the system uses a toy example in the 2-dimensional Euclidean space with only 4 timesteps (as shown in FIG. 11) to compare the non-evolutionary version (upper panels, with α=1) and the evolutionary version (lower panels, with α=0.9) of the NC-based evolutionary spectral clustering algorithms. FIG. 11 shows the clustering results with the correct cluster numbers provided to the algorithm. As can be seen, for the non-evolutionary version, at timestep 2, the two letters D's are confused because they move too near to each other. At timestep 4, due to the change of cluster number, part of the newly introduced letter O is confused with the second D. Neither happens to the evolutionary version, in which the temporal smoothness is taken into account.

As a conclusion, these experiments based on synthetic data sets demonstrate that compared to traditional clustering methods, the instant evolutionary spectral clustering algorithms can provide clustering results that are more stable and consistent, less sensitive to short-term noise, and adaptive to long-term trends.

Figure 12:
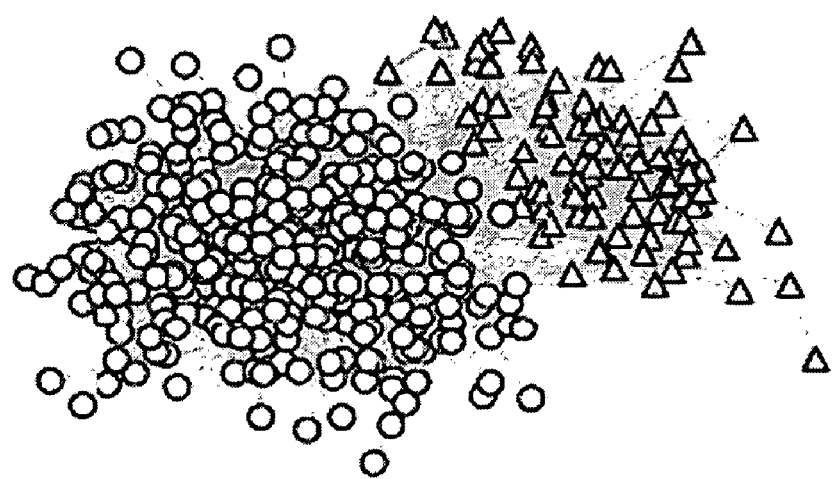

Next, experiments on actual blog data will be discussed. The sample blog data set contains 148,681 entry-to-entry links among 407 blogs crawled by a crawler during 63 consecutive weeks, between Jul. 10, 2005 and Sep. 23, 2006. By looking at the contents of the blogs, the system discovered two main groups: a set of 314 blogs with technology focus and a set of 93 blogs with politics focus. FIG. 12 shows the blog graph for this data set, where the nodes are blogs (with different labels depending on their group member) and the edges are interlinks among blogs (obtained by aggregating all entry-to-entry links).

One application of clustering blogs is to discover communities. Since the system already has the ground truth of the two communities based on content analysis, the system starts by running the clustering algorithms with k=2. The data is prepared in this way: each week corresponds to a timestep; all the entry-to-entry links in a week are used to construct an affinity matrix for the blogs of that week (i.e., those blogs that are relevant to at least one entry-to-entry link in that week); and the affinity matrix is used as the similarity matrix W in the clustering algorithms. For baselines, the system again uses ACC and IND, except that this time the normalized cut algorithm is used. For our algorithms, the system uses the NC-based PCQ and PCM.

Figure 13:
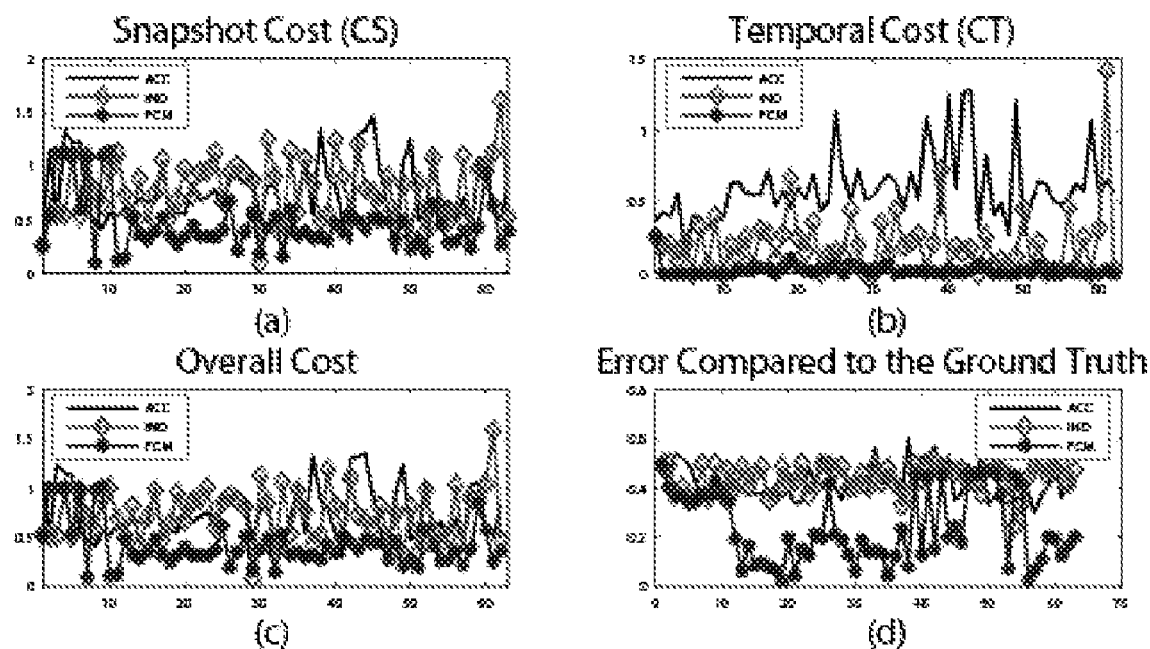
FIG. 13 shows the performance of evolutionary spectral clustering on the data set of FIG. 12.

FIGS. 13(a),(b), and (c) give the $CS_{NC}$, $CT_{NC}$, and $Cost_{NC}$ for the two baseline algorithms and the PCM algorithm (to make the figures readable, the results for PCQ, which are similar to those of PCM, as shown in Table 1 were not plotted). In FIG. 13(d), the error between the cluster results and the ground truth obtained from content analysis is shown, where the error is the distance between partitions defined in the equation for negated average association. As can be seen from these figures, the evolutionary spectral clustering has the best performance in all four measures. The high snapshot cost of IND could be due to the non-robustness of the normalized cut package. In addition, $CT_{NC}$ is usually smaller than $CS_{NC}$ because $CT_{NC}$ is computed over those nodes that are active in both t and t−1 and such nodes are usually less than those that are active at t. This is also one of the reasons for the high variation of the curves.

TABLE 1

Performance under Different Cluster Numbers for the Blog Data Set

|       |            | ACC  | IND  | NC_PCQ | NC_PCM |
|-------|------------|------|------|--------|--------|
| k = 2 | CS         | 0.76 | 0.79 | 0.68   | 0.46 |
|       | CT         | 0.59 | 0.20 | 0.10   | 0.06 |
|       | Total Cost | 0.74 | 0.73 | 0.63   | 0.42 |
| k = 3 | CS         | 1.22 | 1.53 | 1.12   | 1.07 |
|       | CT         | 0.98 | 0.22 | 0.24   | 0.02 |
|       | Total Cost | 1.21 | 1.43 | 1.06   | 0.98 |
| k = 4 | CS         | 1.71 | 2.05 | 1.70 | 1.71 |
|       | CT         | 1.40 | 0.18 | 0.39   | 0.03 |
|       | Total Cost | 1.69 | 1.89 | 1.59   | 1.57 |

In addition, the system runs the algorithms under different cluster numbers and report the performance in Table 1, where the best results among the same category are in bold face. Our evolutionary clustering algorithms always give more stable and consistent cluster results than the baselines where the historic data is totally ignored or totally aggregated.

There are new challenges when traditional clustering techniques are applied to new data types, such as streaming data and Web/blog data, where the relationship among data evolves with time. On one hand, because of long-term concept drifts, a naive approach based on aggregation will not give satisfactory cluster results. On the other hand, short-term variations occur very often due to noise. Preferably the cluster results should not change dramatically over short time and should exhibit temporal smoothness. In this paper, the system proposes two frameworks to incorporate temporal smoothness in evolutionary spectral clustering. In both frameworks, a cost function is defined where in addition to the traditional cluster quality cost, a second cost is introduced to regularize the temporal smoothness. The system then derives the (relaxed) optimal solutions for solving the cost functions. The solutions turn out to have very intuitive interpretation and have forms analogous to traditional techniques used in time series analysis. Experimental studies demonstrate that these new frameworks provide cluster results that are both stable and consistent in the short-term and adaptive in the long run.

The above two processes or frameworks incorporate temporal smoothness in evolutionary spectral clustering. These processes solve corresponding cost functions for the evolutionary spectral clustering problems. The system's evolutionary spectral clustering processes provide stable and consistent clustering results that are less sensitive to short-term noises while at the same time are adaptive to long-term cluster drifts. As discussed below, performance experiments over a number of real and synthetic data sets illustrate the system's evolutionary spectral clustering methods provide more robust clustering results that are not sensitive to noise and can adapt to data drifts.

The invention may be implemented in hardware, firmware or software, or a combination of the three. Preferably the invention is implemented in a computer program executed on a programmable computer having a processor, a data storage system, volatile and non-volatile memory and/or storage elements, at least one input device and at least one output device.

By way of example, a block diagram of a computer to support the system is discussed next. The computer preferably includes a processor, random access memory (RAM), a program memory (preferably a writable read-only memory (ROM) such as a flash ROM) and an input/output (I/O) controller coupled by a CPU bus. The computer may optionally include a hard drive controller which is coupled to a hard disk and CPU bus. Hard disk may be used for storing application programs, such as the present invention, and data. Alternatively, application programs may be stored in RAM or ROM. I/O controller is coupled by means of an I/O bus to an I/O interface. I/O interface receives and transmits data in analog or digital form over communication links such as a serial link, local area network, wireless link, and parallel link. Optionally, a display, a keyboard and a pointing device (mouse) may also be connected to I/O bus. Alternatively, separate connections (separate buses) may be used for I/O interface, display, keyboard and pointing device. Programmable processing system may be preprogrammed or it may be programmed (and reprogrammed) by downloading a program from another source (e.g., a floppy disk, CD-ROM, or another computer).

Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

The invention has been described herein in considerable detail in order to comply with the patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A method for clusterizing information, comprising
    a. determining similarity matrix for historical information and similarity matrix for current information;
    b. generating an aggregated similarity matrix (aggregated kernel); and
    c. applying evolutionary spectral clustering on the aggregated kernel to a content stream to produce one or more clusters.

2. The method of claim 1, comprising changing the number of clusters.

3. The method of claim 2, comprising scaling the similarity matrices.

4. The method of claim 1, comprising linearly combining the similarity matrices to obtain the kernel.

5. The method of claim 1, comprising determining a quality of current cluster result.

6. The method of claim 1, comprising determining temporal smoothness.

7. The method of claim 1, comprising generating evolutionary clusters.

8. The method of claim 1, comprising defining a cost function to measure a quality of a clustering result on evolving information.

9. The method of claim 8, wherein the cost function is defined using one or more graph-based measures.

10. The method of claim 8, wherein the cost function comprises $$\text{Cost} = \alpha \cdot CS + \beta \cdot CT$$

where CS represents a snapshot cost that measures a snapshot quality of a current clustering result with respect to current data features and CT represents a temporal cost that measures a temporal smoothness, and where $0 \leq \alpha \leq 1$ is a parameter assigned by a user and together with $\beta (=1-\alpha)$, reflect the user's emphasis on the snapshot cost and temporal cost.

11. The method of claim 10, wherein CT represents a goodness-of-fit of the current clustering result with respect to historic data features.

12. The method of claim 10, wherein CT measures a cluster quality.

13. The method of claim 10, comprising determining a negated average association for evolutionary spectral clustering.

14. The method of claim 10, comprising determining a normalized cut for evolutionary spectral clustering.

15. The method of claim 1, comprising deriving corresponding optimal solutions.

16. The method of claim 15, wherein the optimal solutions are relaxed.

17. The method of claim 1, comprising clusterizing blog sites for community detection.

18. A method for clusterizing information, comprising
   a. determining a first similarity matrix from a historic cluster obtained from historic information;
   b. generating an aggregated similarity matrix (aggregated kernel); and
   c. applying evolutionary spectral clustering on the aggregated kernel to a content stream to produce one or more clusters.

19. The method of claim 18, comprising changing the number of clusters and providing for insertion or removal of one or more nodes.

20. The method of claim 18, comprising linearly combining the similarity matrices to obtain the aggregated kernel.

21. The method of claim 18, comprising determining temporal smoothness.

22. The method of claim 18, comprising generating evolutionary clusters.

23. The method of claim 18, comprising determining a cost function $$\text{Cost} = \alpha \cdot CS + \beta \cdot CT$$

where CS represents a snapshot cost that measures a snapshot quality of a current clustering result with respect to current data features and CT represents a temporal cost that measures a temporal smoothness, and where $0 \leq \alpha \leq 1$ is a parameter assigned by a user and together with $\beta(=1-\alpha)$, reflect the user's emphasis on the snapshot cost and temporal cost.

24. The method of claim 18, comprising clusterizing blog sites for community detection.

25. The method of claim 18, comprising changing cluster numbers.

* * * * *